Patented Sept. 25, 1951

2,569,151

UNITED STATES PATENT OFFICE 2,569,151

LUBRICATING RUBBER DURING VULCANIZATION

Irven E. Coffey, St. Louis, Mo., assignor to Carter Carburetor Corporation, St. Louis, Mo., a corporation of Delaware No Drawing. Application October 30, 1947, Serial No. 783,217

3 Claims. (Cl. 18—47)

This invention relates to the manufacture of sheeting formed of or coated with rubber or rubber-like material, such as synthetic rubber.

My co-pending application, Serial No. 715,040, filed December 9, 1946, discloses a method of making synthetic rubber coated fabric sheets especially adapted for forming fuel pump diaphragms. Briefly, this method consists in application of synthetic rubber in uncured state to both surfaces of fabric sheet material by means of calendering rolls. The long strips of coated material are rolled for storage and transportation purposes, and then are cured in a curing press by the application of pressure in a curing press and heat of approximately 300 to 315° F. In order to prevent the uncured coating from sticking to adjacent layers in the storage rolls and to the press during curing, the coating is covered with talcum, or in some cases, a very thin material, such as Holland cloth, is wound between the rolls to prevent the layers from sticking together. The Holland cloth provides an additional operation and material which affects the cost of the operation and the talcum powder has a disadvantage of tending to form peaks or grains on the die and on the surface of the finished diaphragm material.

Accordingly, it is an object of the present invention to provide a novel method and means of preventing the uncured, coated sheeting from sticking together and to the curing press, while eliminating the fouling of the press and the surface of the sheeting, as noted.

This object and other more detailed objects are obtained by my novel method which, in addition to the steps described in the above mentioned co-pending application, involves the application of a hard, synthetic wax product having a high melting point in powdered form to the uncured synthetic rubber coating just after withdrawal from the calendering rolls. The full process, therefore, is as follows:

Synthetic rubber, of the Buna-N type, is applied in gobs to the surfaces of a suitable fabric just before entering the calendering rolls. The synthetic rubber is spread smoothly upon the surface of the fabric by the rolls and, upon emerging therefrom, the sticky surfaces are dusted with the powdered wax just mentioned. I have found that powdered cetylacetamide wax sold commercially under the proprietary name of Acrawax C has the desired qualities. This powdered material remains finely pulverized and non-tacky under normal atmospheric conditions and during storage of the uncured coated material in rolls. The particular material is selected as having a melting point at slightly less than 300° F., actually about 280° F., so as to be rendered fluid during the curing operation. This causes the material to flow evenly upon the surface of the sheeting, thus wholly avoiding the peaks and grains otherwise formed on the dies and in the surface of the sheeting material while maintaining its lubricating effect until curing is completed. Similar products may be obtained having different melting points so that the particular powder used will become fluid just below the curing temperature of the synthetic rubber material.

Coated material of this type, is especially adapted for use in making diaphragms, but the novel step herein described, of course, may be used in making other articles of synthetic or natural rubber. The exclusive use of the novel method, and particularly the step of dusting with powdered synthetic wax having a high melting point, as hereafter claimed, and as come within the scope of the appended claims, is contemplated.

I claim:

1. The method of manufacturing articles having surfaces of rubber or rubber-like material which includes the steps of dusting the uncured rubber surface with powdered cetyl acetamide wax having a melting point slightly under 300° F. and applying curing pressure at a temperature slightly above said melting point so as to cause said wax to flow evenly over the surface of the sheet while preventing the sheet from sticking to the press or objects which it contacts in the uncured state.

2. In the manufacture of natural and synthetic rubber articles, the step which consists in applying to the tacky surface of the uncured rubber as a lubricant powdered cetyl acetamide wax having a melting point slightly below the curing temperature of the rubber.

3. In the manufacture of articles of natural or synthetic rubber involving curing the rubber in a mold with the application of heat, the step of applying to the tacky, uncured surface of the rubber powdered cetyl acetamide wax having a melting point slightly below the curing temperature so as to be liquified and dispersed at the curing temperature to provide a smooth, continuous liquid lubricant for uniformly coating the surface exposed to the backing or curing surface.

IRVEN E. COFFEY.

(References on following page)

REFERENCES CITED

The following references are of record in the file of this patent:

UNITED STATES PATENTS

| Number | Name | Date |
|---|---|---|
| 2,051,849 | Hanna | Aug. 25, 1936 |
| 2,195,424 | Raiche | Apr. 2, 1940 |
| 2,366,853 | Greene | Jan. 9, 1945 |
| 2,443,888 | Bohrer | June 22, 1948 |

OTHER REFERENCES

"Synthetic Organic Chemicals," published by Carbide and Carbide Chemicals Corporation, Eleventh edition, June 1, 1942, page 66.

"Chemicals by Glyco," published by Glyco Products Co., Inc., 1944, page 78.